United States Patent Office 2,852,388

Patented Sept. 16, 1958

2,852,388

CONCENTRATED EXTRACTS OF TEA

Jose C. Cortez, New York, N. Y.

No Drawing. Application June 8, 1954
Serial No. 435,361

14 Claims. (Cl. 99—77)

The present invention relates to improvements in concentrated extracts of pure tea in liquid form, either frozen or non-frozen, as well as in the form of dry transparent flakes and other dry forms and to methods of making the same, and has for its object to provide concentrated extracts of pure tea of this character which are characterized by instant solubility in cold water, by stability to change and deterioration by age and which, when dissolved or diluted by the addition of water will possess substantially all of the intrinsic tea characteristics in respect to taste, flavor, color, clarity, brilliance, transparency and stimulating properties of the freshly brewed tea beverage, both iced and hot.

Another object of the invention is to provide suitable means for effective exhaustive extraction of the edible, coloring, flavoring and stimulating extractive constituents presently found combined in tea leaves so as to produce a greater number of tea cups per pound of tea than it has been possible by means heretofore employed.

My invention is really applicable to all kinds of teas, tea siftings and blends thereof, such as for example, the fermented or black teas, the unfermented or green teas, the semi-fermented or "Oolong" teas, as well as applicable to such caffein bearing tea-like leaves as the several varieties of South American maté and blends thereof, maté-tea blends and the like.

Due to the growing demand for tea in the form of iced tea, extensive investigations have been made in order to produce stable, concentrated extracts of pure tea in convenient marketable form, suitable to produce iced tea of the best quality using only plain cold tap water instead of boiling water, but so far as I am aware, a stable concentrated extract of pure tea of this character in suitable market form, suitable to duplicate exactly with cold water the iced tea beverage which is produced by freshly brewing tea with briskly boiling water according to the approved official instructions for making "home made" full flavored tea has not as yet been produced up to the present time.

There are on the market a number of tea compositions in concentrated liquid and powder form, as well as a few concentrated extracts of pure tea in powder form known as instant teas, but none of them has produced the desired results, proven satisfactory or attained any degree of commercial success, for only a very small fraction of the tea consumed in this country is prepared from these concentrates. Tea concentrates have also been made for the daily requirements of restaurants and the like by brewing the tea in the usual fashion but using several times as much tea in proportion to the boiling water and also by steeping the tea for a much longer period in the water. Such concentrates are however so unstable that the National Restaurant Association advises its members that they should not be kept more than six hours. It has also been proposed to make tea infusions of normal strength and condense by evaporation in vacuo but beverages made from such concentrates by the addition of water are flat and insipid and do not have a true tea flavor.

The concentrated extracts of pure tea heretofore produced in powder form have a great affinity for air and thereby retain a great volume of entrained air between the particles which results not only in foamy unappetizing beverages but also in exceedingly poor stability, for the powders cake very easily and become stale in relatively short periods of time on the shelf or in storage. On the other hand, the pure tea concentrates in powder form cannot be dissolved in cold water and consequently only by using briskly boiling water can the beverages be reconstituted from them but the beverages so reconstituted are in turn characterized by being foamy, of exceedingly poor stability, palatability and drinking qualities.

Just what constituents of the tea infusion are the cause of this instability of tea concentrates and tea extracts as heretofore made are not fully known but I have discovered that by simultaneously extracting and changing the polarity characteristics of the tea constituents by subjecting the same to ion-exchange in water solution at high temperature, by concentrating the ion-modified extract to any desired strength and quick-freezing the same and by absorbing the ion-modified concentrate in the absence of air into a suitable film-forming derivative of an hydrophilic colloid, stable, concentrated extracts of pure tea can be made in any suitable marketable form, such as liquid-frozen, liquid unfrozen, dry transparent flakes, pellets, granules or beads. Such extracts have a yield of between 250 and 300 tea cups per pound of leaves extracted, are characterized by instant solubility in plain cold tap water and when so dissolved, will possess substantially all of the intrinsic tea characteristics in respect to taste, color, flavor, clarity, brilliance, transparency and stimulating properties of the freshly brewed tea beverage, both iced and hot, which is produced according to the official instructions for making "home made" full flavored tea approved by The Tea Association of the United States and by the National Restaurant Association.

My improved process for exhaustive extraction of tea leaves has the further advantages over processes previously employed that it can be carried out by means of an integrated, continuous processing operation in a very simple, practical and inexpensive manner. The tea constituents may be contacted with the particles of the ion-exchanging agent either in situ, as presently found in the leaf cells or in vitro, while hot, immediately after extracted. Obviously the ion-exchanging agents per se, and any and all other agents, processing materials and equipment to be used must be perforce non-toxic, non-reactive with the tea constituents and, most important of all, incapable of developing or rendering any strange undesirable odor, or taste at temperatures from below zero to one hundred degrees centigrade and above.

Among the types of ion-exchanging agents which at this time I have found to be the most suitable to fulfill the requirements of that part of the process directly concerned with changing the polarity characteristics of the tea constituents by means of ion-exchange at high temperature, are those characterized by having great surface area, spongy structure, mobility, base-exchange properties and strong negative polarity, such as, for example, the inert mineral clays of the montmorillonite and volcanic bentonite family, and synthetic ion-exchange resins to which the same physical characteristics can be given, in the order of "Amberlite" ion-exchange resins and the like. Montmorillonite and volclay bentonite are entirely free from odor, color and taste and capable of developing none in water at high and low temperatures. When dispersed in hot distilled water, these mineral clays separate into extremely fine, ultramicroscopic, mobile particles of sponge-like structure possessing base-exchange properties and carrying strong negative charges which cause them to attract, to cling and to neutralize positively charged particles of matter, both organic and inorganic. When neutralized by oppositely charged particles as in the case of tea, the spent particles flock together forming sponge-like aggregates which can be separated by filtration without difficulty from the ion-modified, stable, full flavored tea solution.

Among the types of film-forming hydrophilic colloids derivatives which at this time I have found to be the most suitable to fulfill the requirements of that part of the process relative to the adsorption in the absence of air of the ion-modified tea concentrates, are those designated as lyophilic or reversible of low viscosity, such as ammonium, sodium and potassium salts of pectinic, alginic and like acids, sodium carboxymethylcellulose and the like. These compounds will redissolve instantly in water at low and high temperatures and are characterized further by being edible, tasteless, colorless and odorless and capable of developing no taste, odor or color in water at high and low temperatures, and of producing solutions of very low viscosity in distilled water which in turn will give, upon drying, brittle, clear, colorless films of perfect transparency.

The process is preferably carried out as a batch process and there is no limit on the quantity that can be made at one operation, except that the batch should not be so large as to make the maintenance of optimum conditions difficult with the apparatus available. As this application is not concerned with apparatus I will describe the process as carried out on a laboratory scale.

I prefer first to erect an assembly consisting of a Pyrex glass percolator of conical shape of six thousand cubic centimeters capacity set up to discharge directly about one-half inch from the bottom into a Pyrex glass beaker of four thousand cubic centimeters capacity resting on a hot plate about two feet away from the percolator and provided with a glass or stainless steel stirring propeller which is set to turn also about one-half inch from the bottom of the beaker.

The selected kind of tea leaves is first ground, preferably in a refrigerated mill to a suitable degree of fineness, in the order of one-half square millimeter or thereabouts, that will permit to achieve quick, exhaustive extraction at high temperature on the one hand, and on the other, the utilization of the tea particles after extraction for trapping and retaining the spent particles of the strong negatively charged ion-exchanging agent.

Five hundred grams by weight of good black tea, Lipton's brand or its equivalent properly ground are placed in the percolator loosely packed by first placing a five-ply circular piece of wet cotton gauze of suitable size at the bottom of the percolator and then building a bed in the conical column with the tea powder in such manner that most of the coarser particles are concentrated at the base. Then five hundred grams by weight of an eight percent solution in distilled water of low viscosity sodium pectinate, having a pH value of six to eight, are placed in the beaker into which the percolator discharges. The liquid level in the beaker will be several inches above the discharge outlet of the percolator. Four thousand cubic centimeters of distilled, non-ionic water in a Pyrex glass or enameled vessel of suitable capacity are put on the fire and when the temperature of the water has reached about seventy degrees centigrade, then ten grams by weight of granular montmorillonite or volclay bentonite are dispersed in the water by sprinkling the granules over the whole surface so that each granule falls separately on the surface of the water. When all of the granules have touched the bottom of the vessel, the same are allowed to stand undisturbed for a few minutes and then stirred gently with a glass rod or paddle until a thoroughly homogenous dispersion is thereby obtained. At this point, the solution of sodium pectinate in the beaker is heated to fifty degrees centigrade and maintained at this temperature. When the dispersion of montmorillonite or volclay bentonite has reached the boiling point and the same is boiling rather briskly, it is poured all at once but slowly over the tea powder in the percolator and the tea concentrate allowed to drain at normal flow into the adsorbent in the beaker but just after the air has been driven out by the flow of the concentrate and before the first drop of the concentrate reaches the adsorbent, the stirring propeller is set in motion at low speed to avoid the formation of air bubbles or aeration of any kind.

In a word, the ion-modified tea concentrate must be adsorbed into the adsorbent in the absence of air and for this reason the mouth of the discharging glass tube must be always below the surface of the liquid-adsorbent in the beaker. If the flow of the concentrate from the percolator into the beaker becomes too slow or the same stops after it has begun, the tea powder in the percolator should be stirred gently and slowly on the surface with a glass rod or paddle but never going deeper than one inch from the dividing line at the top between tea powder and water. The temperature of the adsorbent and that of the tea concentrate being adsorbed in the beaker by the stirring operation is to be maintained at fifty degrees centigrade by means of the hot plate until the last drop of the concentrate has drained into the beaker, at which time the heat under the beaker is turned off but the stirring operation is to be continued uninterrupted until the temperature of the adsorbed tea concentrate in the beaker has cooled down to room temperature.

The concentrated extract of pure tea thereby obtained will measure two thousand six hundred cubic centimeters and will produce 260 cups of home made full flavored tea, ten cubic centimeters of this concentrate being sufficient to produce one cup of full flavored hot tea or one glass of full flavored iced tea.

Immediately after the concentrate has cooled down to room temperature it should be packed in suitable labeled clear glass containers ready for sale and distribution and quick-frozen by any suitable means until the tea concentrate in the glass containers becomes a very hard, transparent, dark-amber colored solid. This quick-freezing operation is more efficiently carried out without loss in breakage by lowering the temperature gradually until the concentrate in the glass containers reaches zero degrees centigrade and then quick freezing the concentrate until it becomes a very hard, transparent, dark-amber colored solid as previously explained. The stability of the frozen concentrate is by far much greater than that of the natural tea from which the same has been made, for black tea in its natural state loses or acquires atmospheric moisture and thereby natural tea becomes flat and stale in the course of months and such is not the case with a frozen tea concentrate of this character because full flavored tea can be produced from it even after the concentrate has remained for more than one year in the frozen state.

To make home made full flavored tea instantly with the frozen concentrate upon thawing is extremely simple not only because plain cold tap water instead of boiling water and much less ice is required but particularly because the very same routine used at home to make iced tea by the housewife can be followed, namely: to make the tea first and then icing it, consequently, using the frozen thawed concentrate, the tea is made first to any desired strength according to taste by using one or more teaspoonfuls of the concentrate for each cup of plain cold tap water and pouring the resulting full flavored tea in ice filled glasses. Moreover, home made full flavored hot tea can also be made instantly using briskly boiling water and the concentrate in the same proportions.

On the other hand, a frozen concentrated extract of pure tea of this character will, upon thawing, possess the proper consistency and rheological properties required for dispensing the same by existing standard equipment and automatic vending machines and thereby, full flavored hot and iced tea can be dispensed quickly and effectively at busy food counters in the same fashion and by similar equipment as cola syrup is handled to make the finished soft drink at busy food counters.

Concentrated extracts of pure tea, tea siftings, maté, or tea-maté mixtures of this character in the form of dry transparent flakes, pellets, granules, beads and any other dry form including powder form, can be easily and readily made by the same procedures, using the same extracting and adsorbing apparatus with some variations according to the following example:

Five hundred grams by weight of good black tea, Lipton's brand or its equivalent properly ground are placed in the percolator loosely packed by first placing a five-ply circular piece of wet cotton gauze of suitable size at the bottom of the percolator and then building a bed in the conical column with the tea powder in such a manner that most of the coarser particles are concentrated at the base. Then, five thousand cubic centimeters of distilled non-ionic water in a Pyrex glass or enameled vessel of suitable capacity are put on the fire and when the temperature of the water has reached about seventy degrees centigrade, ten grams by weight of granular montmorillonite or volclay bentonite are dispersed in the water by sprinkling the granules over the whole surface so that each granule falls separately on the surface of the water. When all the granules have touched the bottom of the vessel, the same are allowed to stand undisturbed for a few minutes and then stirred gently with a glass rod or paddle until a thoroughly homogenous dispersion is thereby obtained. When this dispersion has reached the boiling point and the same is boiling rather briskly, it is poured all at once but slowly over the tea powder in the percolator and the tea percolate allowed to drain at normal flow into the connecting receiving beaker which, in the present case must be empty and at room temperature. If the flow of the percolate becomes too slow or the same stops after it has begun, the tea powder in the percolator should be stirred gently and slowly on the surface with a glass rod or paddle but never going deeper than one inch from the dividing line at the top between tea powder and water. When enough of the percolate has drained and collected into the beaker so as to permit efficient stirring, the stirring propeller is set in motion at low speed to avoid the formation of air bubbles or undue aeration and the percolate stirred in this fashion until the last drop of the percolate has drained into the beaker. The percolate thereby obtained will measure three thousand two hundred cubic centimeters or more depending on the blend of tea used. The percolate is then transferred into a dehydrator or evaporator suitable for heat-sensitive liquids and dehydrated or evaporated until half of the water present in the percolate has been removed. Vacuum evaporators or dehydrators should be used, but the percolate may be evaporated in steam jacketed glass lined open vessels provided the temperature of the percolate is never allowed to reach higher than fifty to fifty-five degrees centigrade in order to avoid irreparable losses in flavor and changes in color in the finished dry product.

The concentrated extract thereby obtained is then quick-frozen by any suitable means until it becomes a very hard, evenly transparent, dark-amber colored solid. This quick freezing operation can be carried out more effectively in trays suitable to produce cubes of small size similar to those which are produced at home by ordinary refrigerators, for in this fashion the evenness of color and transparency of the cubes can be readily observed. The solid frozen, evenly transparent dark-amber colored cubes thus formed are placed in a glass lined vessel of suitable size provided with a stirring propeller of stainless steel and allowed to thaw. Upon thawing, the temperature of the resulting liquid concentrate is to be maintained at between five and eight but never higher than ten degrees centigrade, and to the concentrate at this temperature is then added from three to five grams by weight of any suitable, tasteless and odorless filter-aid in fine powdered form, and stirred slowly for half an hour or more until the filter-aid has been thoroughly dispersed into the liquid. Filter-aids in the order of diatomite or diatomaceous silica, such as "Celite," "Hyflo Super-Cell" and "Filter-Cell" and the like are suitable for this purpose. The temperature of the mixture thereby obtained is to be maintained always at between five and eight but never higher than ten degrees centigrade and the mixture is filtered at this very same temperature through any suitable odorless, tasteless and retentive filter media, such as retentive washed filter papers and the like. In this manner, a clear, brilliant, perfectly transparent, ruby colored and full flavored concentrated extract of pure tea is thereby obtained, which at this point is ready and suitable to be adsorbed into suitable film-forming derivatives of hydrophilic colloids as previously explained in the first example. In this connection, however, I have found in actual practice that the adsorption of a tea concentrate of this character into a film-forming derivative of an hydrophilic colloid can be carried out much more effectively by adsorbing this concentrate into another tea concentrate produced according to the first example, from the same grade of tea and containing already the film-forming hydrophilic colloid derivative. For in this fashion, all of the losses in flavor and changes in color which may have occurred during processing will be regained in the dried finished product. This can be easily done by placing from one to one and one-half parts by weight of a tea concentrate produced according to the first example with the same grade of tea into a glass lined vessel provided with a stirring propeller made of glass or stainless steel and then adding to it with slow stirring four parts by weight of the tea concentrate which is to be adsorbed into the film-forming hydrophilic colloid derivative present in the first concentrate. The four parts of concentrate are added little by little in the absence of air with slow stirring to avoid aeration until a homogenous mixture is thereby obtained. The concentrated extract of pure tea thus adsorbed is now ready and suitable to be dried by any suitable means to powder or into dry transparent paper-thin flakes, small pellets, beads or granules for these are the forms which in actual practice have proven to be much more stable than straight powders to produce full flavored tea beverages, hot and cold, entirely free of foam.

Therefore, the concentrate is then transferred into suitable drying equipment for heat-sensitive liquids and dried to thin, medium or relatively thick brittle transparent films suitable to be broken into flakes, pellets or granules as the case may be. The stable dry pure tea product thereby obtained in the form of bright, glossy, thin transparent flakes weighs ninety-six grams and it will produce 240 cups of full flavored tea, for not more than forty centigrams are required to produce one cup of hot or one glass of full flavored iced tea.

In connection with the drying of concentrated extracts of pure tea of this character, the standard vacuum dryers used in the manufacture of instant soluble coffees are entirely suitable and may be used for this purpose. The vacuum belt dryer, for example, has a stainless steel belt moving through a vacuum chamber, the tea concentrate may be sprayed on the belt before it enters the chamber, drying occurs at low temperature and at the end of the cycle a scraper removes the dried film from the belt, crushing or pelleting operations can follow. Another type of suitable dryer is the infra-red freeze dryer in which the water is removed from the frozen concentrate in a vacuum chamber by sublimation. The tea concentrate can be frozen again and placed in the vacuum chamber where it is exposed to wires glowing in a special range of temperature. The water in the form of ice is caused to sublime directly from the frozen concentrate without first going through a liquid phase. Radiation is applied through the transparent bottom of special trays. Drum dryers of the non-vacuum variety may be also used provided the temperature of the concentrate is maintained at relatively low levels in the range of 45 to 55 degrees centigrade, As a rule a thin film of the concentrate is applied to revolving drums of polished stainless steel where it is exposed to a large volume of clean air, a substantial amount of heat is removed, the temperature drops and the dried film is scraped from the drum.

The frozen concentrate may be packed in cans similar to those used for frozen fruit juices. The tea concentrate is quite sensitive to iron contamination but as the freezing time is short and the concentrate is solid when frozen there is little adverse effect from the exposed iron met with in commercial cans.

My tea concentrate may also be packed in properly lined cans such as used for beverages which are stored at ordinary warehouse temperatures and sold by the merchants and handled in the same manner.

When so packed it is preferable to thaw the frozen concentrate out of contact with air and "gas-pack" the cans with nitrogen or other inert gas as is now done with other beverages susceptible to oxidation. Cans so packed will have a shelf life of several months before a noticeable change in flavor occurs. The thawed concentrate may be diluted and, when packed for non-frozen distribution so that the contents of the conventional six ounce can will make, say, six or eight glasses of iced tea.

For household use the frozen concentrate is most desirable as the thawed concentrate will remain unchanged for days in an open jar at the ordinary household refrigerator temperatures.

In the foregoing specification I have described in detail the preferred procedures for making my improved tea concentrate in both liquid and dry form but it is to be understood that my invention is not limited to such procedures except in so far as recited in the accompanying claims.

It will be understood that the word "tea" as used in the appended claims includes other extractible substances such as maté mixtures of tea and maté and the like.

I claim:

1. In a method of making a tea concentrate the step which consists in extracting the tea with heated water in the presence of an ion exchange agent which is a water insoluble solid having extended surface in the order of a microporous body and a strong negative polarity.

2. The process of claim 1 wherein the ion exchange agent is a mineral clay of the montmorillonite family.

3. The method of claim 1 wherein the ion exchange agent is volclay bentonite.

4. The process of claim 1 wherein the ion exchange agent is a synthetic ion exchange resin.

5. The process of claim 1 wherein the tea, ion exchange agent and water infusion is filtered and the filtrate frozen.

6. The process of claim 1 wherein the extract is mixed with a water solution of a film forming hydrophilic colloid.

7. The process of claim 6 wherein the mixture is frozen.

8. The process of claim 1 wherein the extract is mixed with a water solution of a film forming reversible, hydrophilic colloid of low viscosity.

9. The process of claim 6 wherein the colloid is sodium pectinate.

10. The process of claim 6 wherein the colloid is sodium carboxymethyl cellulose.

11. The process of claim 6 wherein the mixture is evaporated to a dry transparent film and comminuted into particles of the desired form.

12. The process of claim 1 wherein the tea concentrate is filtered and frozen and the frozen filtrate is melted and mixed with a water solution of a film forming hydrophilic colloid and evaporated to a dry transparent film and comminuted into particles of the desired form.

13. The process of claim 1 wherein tea, ion exchange agent and water is quick frozen, then thawed, filtered at a temperature not exceeding 10° C. and mixed with a water solution of a hydrophilic colloid.

14. The process of claim 13 wherein the mixture is evaporated to a dry transparent film and comminuted into particles of the desired form.

References Cited in the file of this patent

UNITED STATES PATENTS

| | | |
|---|---|---|
| 1,854,062 | Potter et al. | Apr. 12, 1932 |
| 2,393,562 | Perech | Jan. 22, 1946 |
| 2,476,072 | Tressler | July 22, 1949 |
| 2,573,406 | Clough et al. | Oct. 30, 1951 |
| 2,626,558 | Stein | Jan. 27, 1953 |